(12) United States Patent  
Lechner et al.

(10) Patent No.: US 9,137,272 B2  
(45) Date of Patent: Sep. 15, 2015

(54) SHARED SCHEDULING FOR CONTENT DELIVERY SYSTEMS

(71) Applicant: Verizon Patent and Licensing Inc., Basking Ridge, NJ (US)

(72) Inventors: Marcelo D. Lechner, Burlington, MA (US); Lily F. Chen, Fort Lee, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 467 days.

(21) Appl. No.: 13/713,879

(22) Filed: Dec. 13, 2012

(65) Prior Publication Data

US 2014/0172966 A1    Jun. 19, 2014

(51) Int. Cl.  
*G06F 15/16* (2006.01)  
*H04L 29/06* (2006.01)  
*H04N 21/20* (2011.01)

(52) U.S. Cl.  
CPC .......... *H04L 65/403* (2013.01); *H04L 65/4076* (2013.01); *H04N 21/20* (2013.01)

(58) Field of Classification Search  
CPC ... H04L 65/403; H04L 65/4076; H04N 21/20  
USPC ................................................. 709/203–204  
See application file for complete search history.

(56) References Cited

U.S. PATENT DOCUMENTS

| | | | |
|---|---|---|---|
| 6,760,412 B1 * | 7/2004 | Loucks ........................ | 379/88.13 |
| 7,383,308 B1 * | 6/2008 | Groves et al. ................. | 709/206 |
| 8,244,566 B1 * | 8/2012 | Coley et al. ................... | 705/7.11 |
| 8,464,309 B2 * | 6/2013 | Barton .......................... | 725/134 |
| 8,671,009 B1 * | 3/2014 | Coley et al. ................... | 705/7.13 |
| 8,676,034 B2 * | 3/2014 | Malin et al. ................... | 386/291 |
| 9,009,770 B2 * | 4/2015 | Wellen et al. ................. | 725/109 |
| 2002/0196280 A1 * | 12/2002 | Bassett et al. ................. | 345/751 |
| 2006/0045924 A1 * | 3/2006 | Chen et al. .................... | 424/735 |
| 2006/0047557 A1 * | 3/2006 | Bieselin et al. ................... | 705/9 |
| 2007/0077028 A1 * | 4/2007 | Bodkin et al. .................. | 386/95 |
| 2008/0082980 A1 * | 4/2008 | Nessland et al. .............. | 718/104 |
| 2008/0222678 A1 * | 9/2008 | Burke et al. .................... | 725/44 |
| 2008/0313005 A1 * | 12/2008 | Nessland et al. .................. | 705/9 |
| 2009/0119701 A1 * | 5/2009 | Aldrey et al. .................. | 725/32 |
| 2010/0121665 A1 * | 5/2010 | Boyer .............................. | 705/8 |
| 2010/0272414 A1 * | 10/2010 | Reneris .......................... | 386/83 |
| 2012/0254913 A1 * | 10/2012 | Di Mattia et al. .............. | 725/34 |
| 2013/0085895 A1 * | 4/2013 | Lakshminarayanan et al. .......................... | 705/26.81 |

* cited by examiner

*Primary Examiner* — Hamza Algibhah  
*Assistant Examiner* — Michael A Chambers

(57) ABSTRACT

One or more servers may receive, from a first server, a first list of timeslots; receive, from a second server, a second list of timeslots; store the first list of timeslots and the second list of timeslots to form a shared list of timeslots; receive an update to the shared list of timeslots by the first server or by the second server; store the update to the shared list of timeslots; receive a first schedule from the first server; and receive a second schedule from the second server. The first server may generate the first schedule and the second server may generate the second schedule based on information stored by the shared list of timeslots. The one or more servers may provide a particular content file to a user device in accordance with information associated with the first schedule or the second schedule.

20 Claims, 8 Drawing Sheets

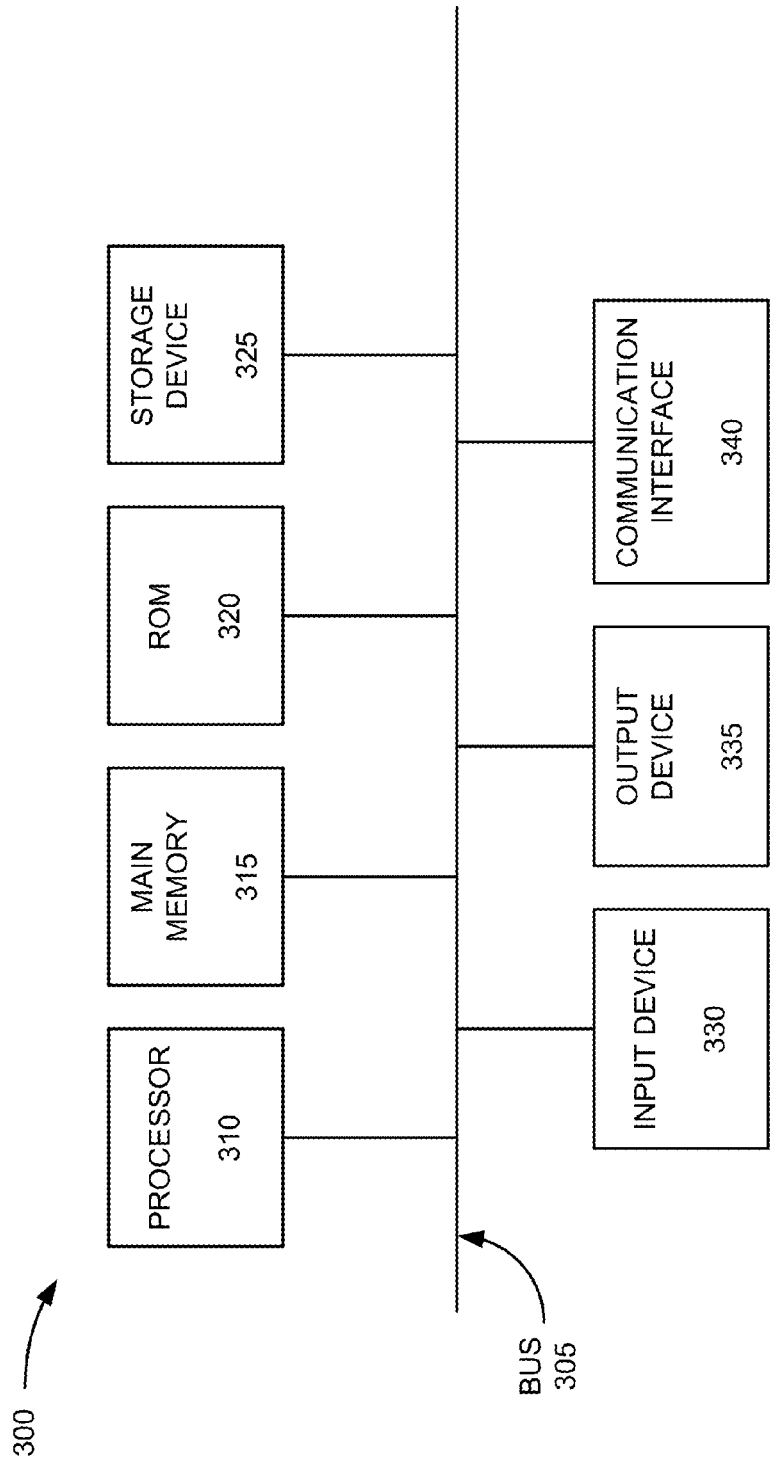

Shared Schedule 410

| Channel | Timeslot | Owner | Content |
|---|---|---|---|
| 500 | 10:02:00-10:02:30 | Default | A |
| 500 | 10:02:30-10:03:00 | Default | B |
| 500 | 10:03:00-10:03:30 | Available | C |
| 500 | 10:03:30-10:04:00 | Addressable | N/A |
| 501 | 10:02:00-10:02:30 | Addressable | N/A |
| 501 | 10:02:30-10:03:00 | Available | D |
| 501 | 10:03:00-10:03:30 | Default | E |
| 501 | 10:03:30-10:04:00 | Default | F |
| 502 | 10:02:00-10:02:30 | Available | G |
| 502 | 10:02:30-10:03:00 | Addressable | N/A |
| 502 | 10:03:00-10:03:30 | Addressable | N/A |
| 502 | 10:03:30-10:04:00 | Available | H |

Default schedule 420

| Channel | Timeslot | Content |
|---|---|---|
| 500 | 10:02:00-10:02:30 | A |
| 500 | 10:02:30-10:03:00 | B |
| 500 | 10:03:00-10:03:30 | C |
| 501 | 10:02:30-10:03:00 | D |
| 501 | 10:03:00-10:03:30 | E |
| 501 | 10:03:30-10:04:00 | F |
| 502 | 10:02:00-10:02:30 | G |
| 502 | 10:03:30-10:04:00 | H |

Addressable schedule 430

| Channel | Timeslot |
|---|---|
| 500 | 10:03:30-10:04:00 |
| 501 | 10:02:00-10:02:30 |
| 502 | 10:02:30-10:03:00 |
| 502 | 10:03:00-10:03:30 |

Fig. 4A

| Demographic information 440 ||
|---|---|
| User device ID | Demographic Group ID |
| 123 | 1 |
| 456 | 2 |
| 789 | 3 |
| 012 | 3, 4 |

| Addressable Instructions 450 ||
|---|---|
| Demographic Group ID | Order of delivery |
| 1 | I, J, K |
| 2 | L, N, O |
| 3 | P, Q, R |
| 4 | S, T, U |
| 3, 4 | P, S, Q |

Fig. 4B

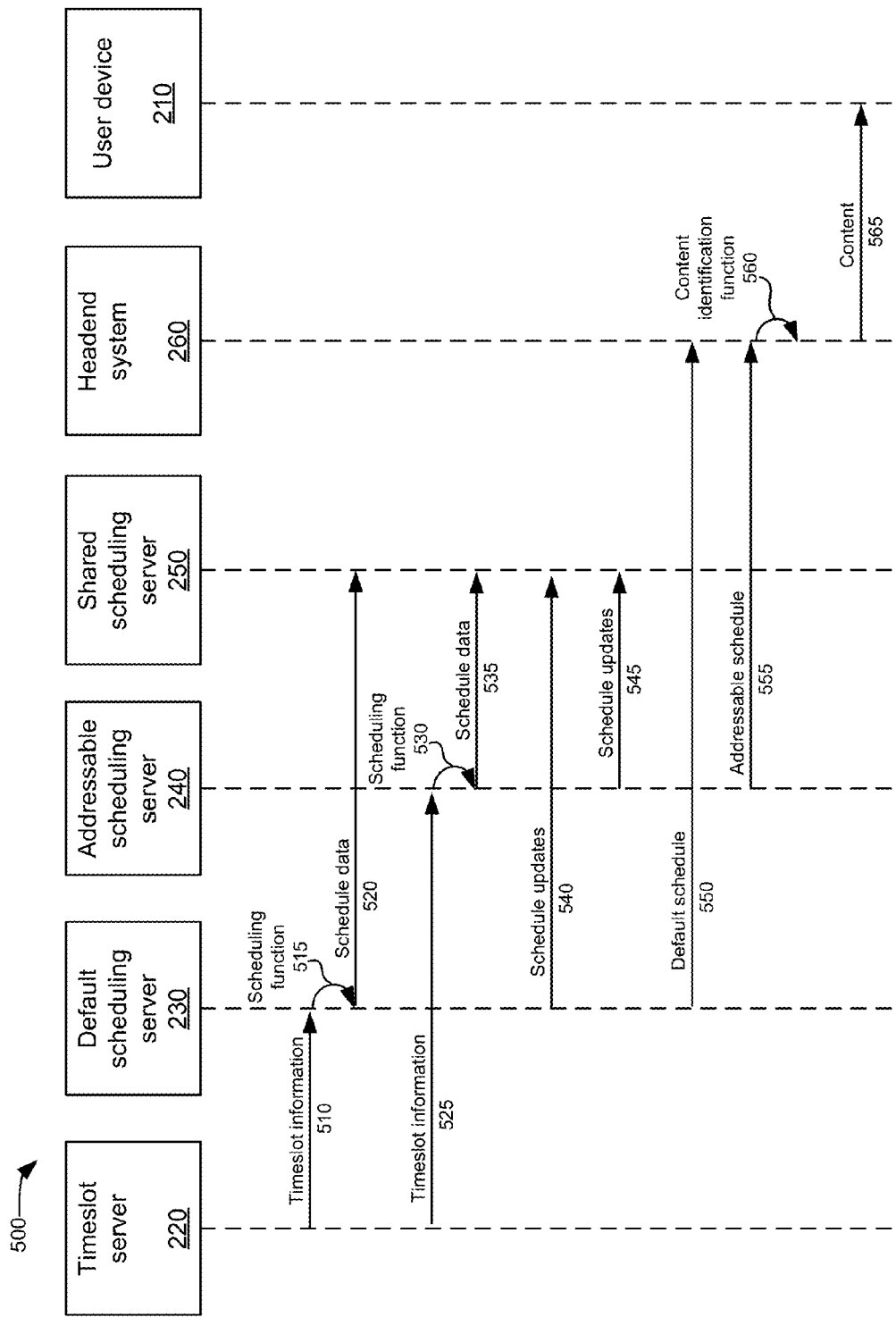

SHARED SCHEDULING FOR CONTENT DELIVERY SYSTEMS

BACKGROUND

Content delivery systems, such as broadcasting systems, sometimes receive content broadcast scheduling information from multiple parties. Scheduling information may sometimes conflict when scheduling information is received from the multiple parties. Resolving the scheduling conflicts is often cumbersome, time-consuming, and inaccurate.

BRIEF DESCRIPTION OF THE DRAWINGS

FIG. 3 illustrates example components of a device that may be used within the environment of FIG. 2;

FIGS. 4A-4B illustrate an example data structure that may be stored by one or more devices in the environment of FIG. 2;

FIG. 5 illustrates a call flow diagram of example operations capable of being performed by an example portion of the environment of FIG. 2.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may include a shared scheduling server to permit multiple scheduling parties to schedule timeslots for broadcasting a content file (e.g., video content, audio content, multimedia content, an advertisement, etc.) to a user device. As a result, the multiple scheduling parties may reserve timeslots such that a particular timeslot may not be reserved by two different parties (e.g., double-booked).

In some implementations, a default scheduling server, associated with a first scheduling party, may reserve a timeslot (e.g., a timeslot corresponding to an advertising timeslot for a television network, or some other timeslot) to broadcast a default content file (e.g., a particular content file) to multiple user devices. An addressable scheduling server, associated with a second scheduling party, may reserve a timeslot to broadcast, to respective user devices, an addressable content file (e.g., a content file addressed to a particular user device). For example, a first addressable content file may be delivered to a first user device whereas a second addressable content file may be delivered to a second user device during a particular timeslot. Thus, the systems and/or methods may prevent scheduling conflicts when the default scheduling server and the addressable scheduling server use a shared scheduling server to reserve timeslots. Further, updates made by either the default scheduling server or the addressable scheduling server may be stored by the shared scheduling server, such that the default scheduling server and the addressable scheduling server may identify up-to-date scheduling information to prevent scheduling conflicts.

Figure 1:
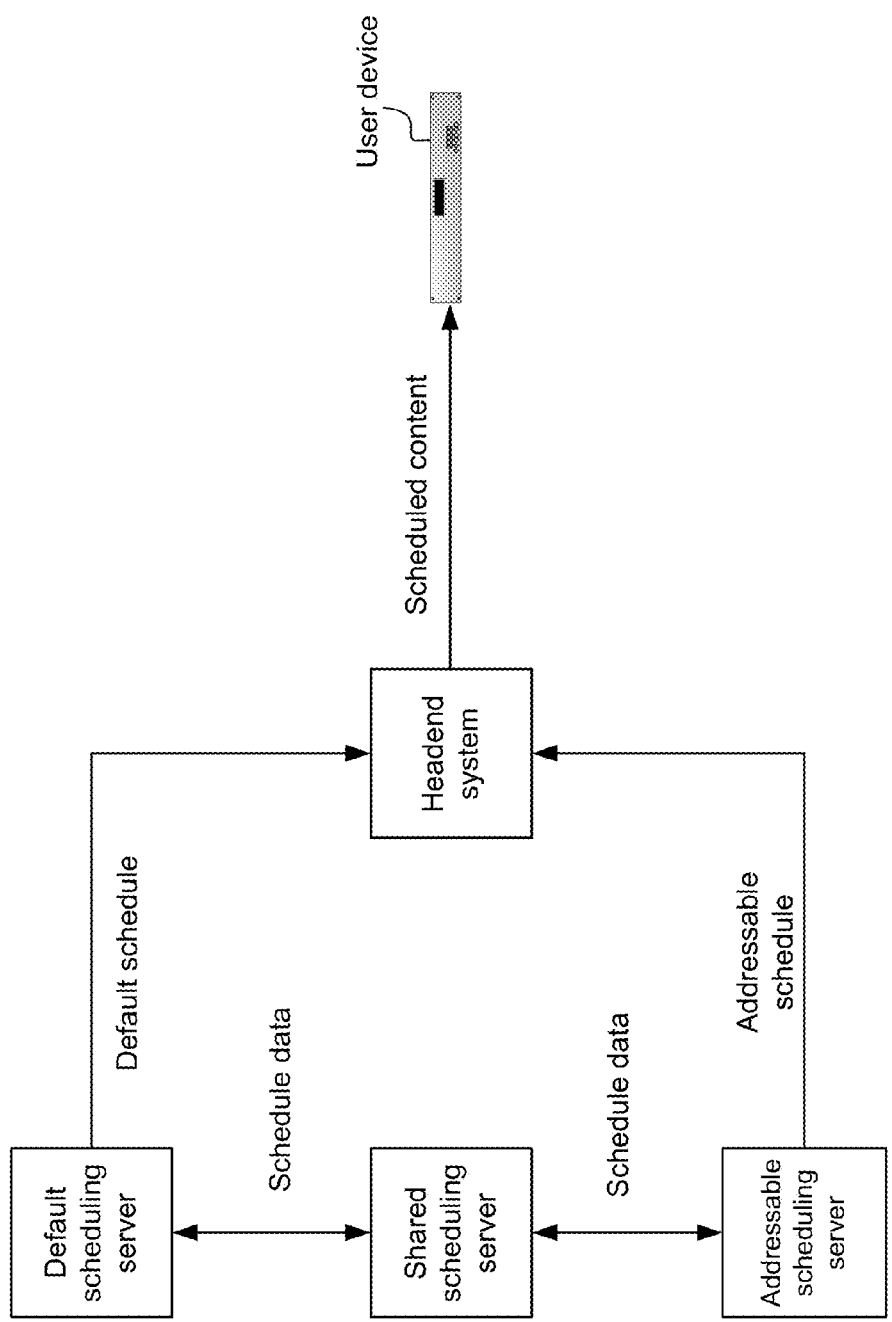
FIG. 1 illustrates an example overview of an implementation described herein.

FIG. 1 illustrates an example overview of an implementation described herein. As shown in FIG. 1, a default scheduling server and an addressable scheduling server may each communicate with a shared scheduling server to provide the scheduling server with information regarding available timeslots with which to broadcast content. In some implementations, the default scheduling server may provide information to the shared scheduling server to identify timeslots that the default scheduling server has reserved to broadcast default content files. The addressable scheduling server may reserve timeslots (e.g., to broadcast addressable content files) based on timeslots that have not been reserved by the default scheduling server.

As further shown in FIG. 1, the default scheduling server may generate a default schedule identifying default content files to broadcast (e.g., content files to broadcast to multiple user devices), and timeslots to broadcast the default content files. The default scheduling server may generate the default schedule based on information stored by the shared scheduling server (e.g., scheduling information shared with the addressable scheduling server), and may provide the default schedule to a headend system (e.g., a broadcasting system to provide content via a television broadcast network, a web broadcast network, or some other type of broadcast network). In some implementations, a default content file may correspond to content relating to a local advertisement, a public service announcement, or some other type content.

As further shown in FIG. 1, the addressable scheduling server may generate an addressable schedule identifying timeslots in which to broadcast addressable content files (e.g., different content files to broadcast to respective user devices based on, for example, demographics information of the respective user devices). The addressable scheduling server may generate the addressable schedule based on information stored by the shared scheduling server, and may provide the addressable schedule to the headend system. In some implementations, the headend system may broadcast scheduled content in accordance with the received default schedule and the received addressable schedule. For example, the headend system may broadcast a default content file to multiple user devices at a time corresponding to scheduling information associated with the default schedule. Additionally, the headend system may determine addressable content files to broadcast to respective user devices at a time corresponding to scheduling information associated with the addressable schedule. In some implementations, an addressable content file may correspond to an advertisement, for example, directed to a particular demographic group.

In some implementations, the default schedule server and the addressable schedule server may communicate updates to their respective schedules via the shared scheduling server such that the default scheduling server and the addressable scheduling server may update their respective schedules and provide updated schedules to the headend system. As a result, the default scheduling server and the addressable scheduling server may not each reserve the same timeslot.

While the systems and/or methods are described in terms of preventing scheduling conflicts for timeslots to broadcast content files, in practice, the systems and/or methods are not so limited. For example, the systems and/or methods may apply to preventing scheduling conflicts for some other purposes. Further, the systems and/or methods may apply to any number of scheduling parties.

Figure 2:
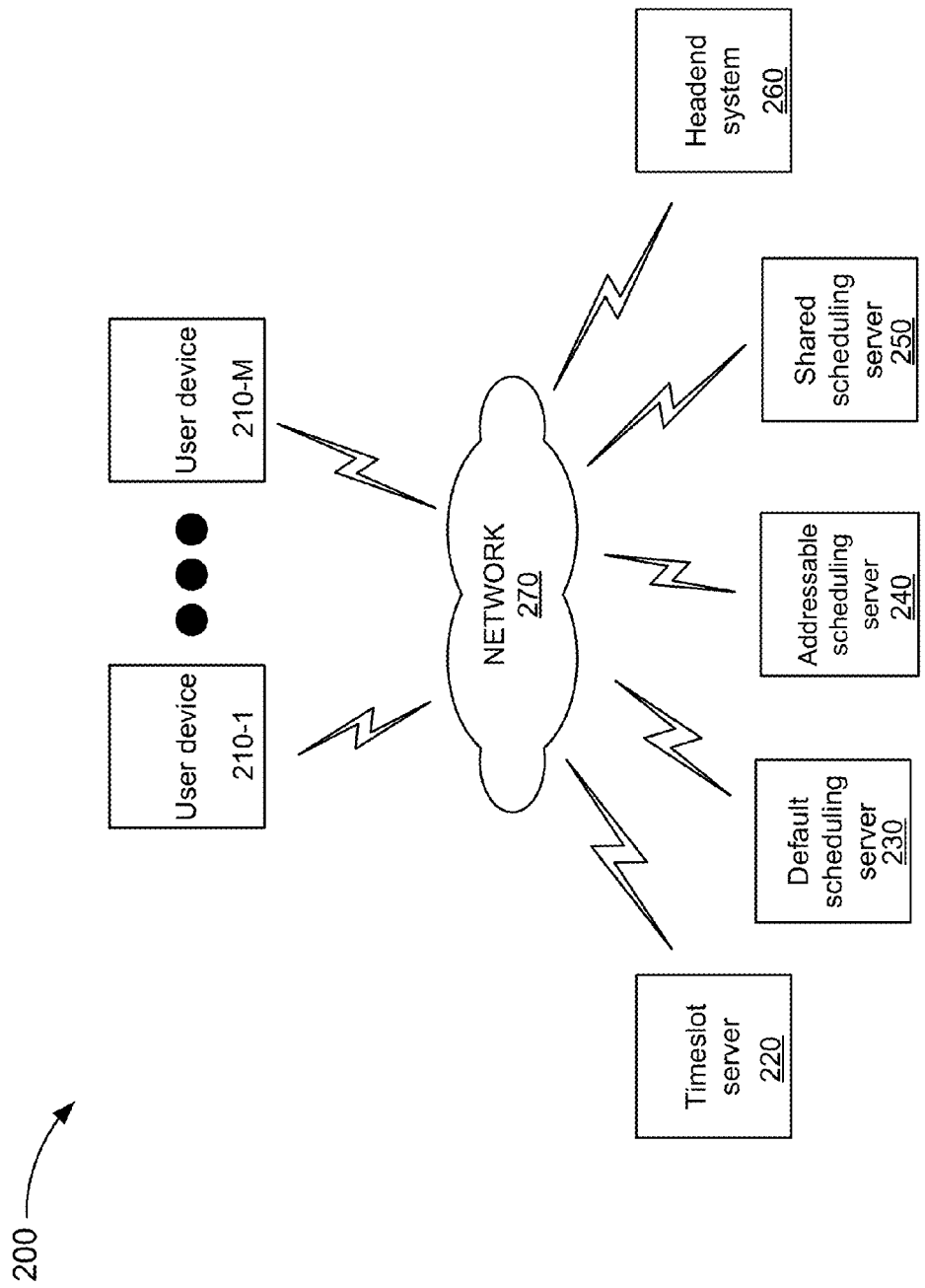
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210-1, . . . , 210-M (where M≥1), timeslot server 220, default scheduling server 230, addressable scheduling server 240, shared scheduling server 250, headend system 260, and network 270.

User device 210 may include a device capable of communicating via a network, such as network 270. For example, user device 210 may correspond to a set-top box, a television, a mobile communication device (e.g., a smart phone or a personal digital assistant (PDA)), a portable computer device (e.g., a laptop or a tablet computer), a desktop computer, a gaming device, or another type of device. In some implementations, user device 210 may receive content files from headend system 260 and play the content files on a display screen and/or a speaker associated with user device 210.

Timeslot server 220 may include a computing device, such as a server device, or a collection of server devices. In some implementations, timeslot server 220 may communicate with default scheduling server 230 and/or addressable scheduling server 240 to provide information regarding available timeslots (e.g., a list of available timeslots) which default scheduling server 230 and/or addressable scheduling server 240 may reserve to create a default schedule or addressable schedule. In some implementations, timeslot server 220 may be associated with a television network which broadcasts content over a particular television channel. The available timeslots may correspond to advertising timeslots associated with the broadcast of advertisements, or some other content. In some implementations, timeslot server 220 may communicate updated timeslot information to default scheduling server 230 and/or addressable scheduling server 240 (e.g., for live broadcasts where advertising timeslots may change).

Default scheduling server 230 may include a computing device, such as a server device, or a collection of server devices. In some implementations, default scheduling server 230 may receive information regarding available timeslots from timeslot server 220 and may provide the information regarding available timeslots to shared scheduling server 250 such that shared scheduling server 250 may store a shared schedule having available timeslot information. In some implementations, default scheduling server 230 may modify the shared schedule stored by shared scheduling server 250 to reserve an available timeslot. Default scheduling server 230 may determine particular content files to schedule for broadcast at particular timeslots on a particular channel (e.g., a television broadcast channel). Additionally, default scheduling server 230 may generate a default schedule including information identifying the default content files (e.g., particular content files) to broadcast to in the particular timeslots and channel. Default scheduling server 230 may provide the default schedule to headend system 260.

Addressable scheduling server 240 may include a computing device, such as a server device, or a collection of server devices. In some implementations, addressable scheduling server 240 may receive information regarding available timeslots from timeslot server 220 and may provide the information regarding available timeslots to shared scheduling server 250. In some implementations, addressable scheduling server 240 may communicate with shared scheduling server 250 to identify available timeslots (e.g., timeslots not reserved by default scheduling server 230) to schedule the broadcast of an addressable content file on a particular channel. Addressable scheduling server 240 may generate an addressable schedule including information identifying timeslots during which to broadcast an addressable content file (e.g., a content file which may differ for respective user devices 210 based on, for example, demographics associated with user devices 210). Addressable scheduling server 240 may provide the addressable schedule to headend system 260.

Shared scheduling server 250 may include a computing device, such as a server device, or a collection of server devices. In some implementations, shared scheduling server 250 may store a data structure including scheduling information shared by default scheduling server 230 and addressable scheduling server 240. For example, the data structure, stored by shared scheduling server 250, may include a list of timeslots and an owner (e.g., default scheduling server 230 or addressable scheduling server 240) of the respective timeslots. Some examples of a data structure that may be stored by shared scheduling server 250 are described below with respect to FIGS. 4A-4B.

Headend system 260 may include a broadcasting system, such as a broadcasting web server, a broadcasting antenna, a master television broadcasting facility, or a combination of servers and/or devices relating to broadcasting or delivering content to user devices. In some implementations, headend system 260 may receive a default schedule from default scheduling server 230 and/or an addressable schedule from addressable scheduling server 240 and provide user device 210 with content files in accordance with received schedules. In some implementations, headend system 260 may store policies and/or instructions to identify a particular addressable content file to provide to a particular user device 210. Headend system 260 may also store identifiers for user devices 210 and demographics information associated with user devices 210.

Network 270 may include one or more wired and/or wireless networks. For example, network 270 may include a television broadcasting network, a cellular network, a public land mobile network (PLMN), a second generation (2G) network, a third generation (3G) network, a fourth generation (4G) network, a fifth generation (5G) network, and/or another network. Additionally, or alternatively, network 270 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates example components of a device 300 that may be used within environment 200 of FIG. 2. Device 300 may correspond to user device 210, timeslot server 220, default scheduling server 230, addressable scheduling server 240, shared scheduling server 250, or headend system 260. Each of user device 210, timeslot server 220, default scheduling server 230, addressable scheduling server 240, shared scheduling server 250, or headend system 260 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

FIGS. 4A-4B illustrate an example data structure 400 that may be stored by one or more devices in environment 200, such as default scheduling server 230, addressable scheduling server 240, shared scheduling server 250, and/or headend system 260. In one implementation, data structure 400 may be stored in a memory of default scheduling server 230, addressable scheduling server 240, shared scheduling server 250, or headend system 260. In another implementation, data structure 400 may be stored in a memory separate from, but accessible by, default scheduling server 230, addressable scheduling server 240, shared scheduling server 250, and/or headend system 260. In some implementations, data structure 400 may be stored by some other device in environment 200, such as timeslot server 220.

A particular field of data structure 400 may be stored by one device in environment 200 while another field of data structure 400 may be stored by another device in environment 200. In some implementations, a particular field of data structure 400 may be stored by multiple devices in environment 200.

As shown in FIGS. 4A-4B, data structure 400 may include shared schedule field 410, default schedule field 420, addressable schedule field 430, demographic information field 440, and addressable instructions field 450.

Shared schedule field 410 (FIG. 4A0 may include shared schedule information stored by shared scheduling server 250. For example, as described above, default scheduling server 230 and/or addressable scheduling server 240 may provide shared scheduling server 250 with respective lists of timeslots which may be reserved by default scheduling server 230 and/or addressable scheduling server 240 to create a default schedule and/or an addressable schedule. In some implementations, shared schedule field 410 may store a shared or consolidated list of timeslots including a list of timeslots provided by default scheduling server 230 and a list of timeslots provided by addressable scheduling server 240. In some implementations, shared schedule field 410 may store a channel number (e.g., to identify a television network with which to schedule a broadcast of a content file), information regarding a timeslot, information regarding an owner of the timeslot (e.g., default scheduling server 230 or addressable scheduling server 240), and information identifying particular content scheduled to be broadcast.

In some implementations, the channel number and corresponding timeslots may be provided by timeslot server 220 to default scheduling server 230 and/or addressable scheduling server 240. Shared scheduling server 250 may store the channel number corresponding timeslots in shared schedule field 410 such that default scheduling server 230 and addressable scheduling server 240 may share the same information to identify available timeslots for particular channels when timeslot server 220 (or different timeslot servers 220) provides different timeslot and channel information to default scheduling server 230 and addressable scheduling server 240.

In some implementations, default scheduling server 230 may reserve a particular timeslot and may store information in shared schedule field 410 to identify a particular content file to broadcast. As an example, assume that default scheduling server 230 reserves the 10:02:00 to 10:02:30 timeslot on channel 500 and that default scheduling server 230 schedules to broadcast a particular content file having an identifier of "A." Given this assumption, shared schedule field 410 may store the information "Default" in the owner field, and "A" in the content field corresponding to the 10:02:00 to 10:02:30 timeslot on channel 500.

As another example, assume that addressable scheduling server 240 reserves the 10:03:30 to 10:04:00 timeslot on channel 500. Given this assumption, shared schedule field 410 may store the information "Addressable" in the owner field, and "N/A" in the content field corresponding to the 10:03:30 to 10:04:00 timeslot on channel 500. In some implementations, the content field may store "N/A" to identify that a particular content file to broadcast need not be identified when the timeslot is reserved to broadcast an addressable content file and not a particular content file (e.g., a default content file).

As another example, assume that neither default scheduling server 230 nor addressable scheduling server 240 has reserved the 10:03:00-10:03:30 timeslot on channel 500. Given this assumption, shared schedule field 410 may store the information "Available" in the owner field to identify that neither default scheduling server 230 nor addressable scheduling server 240 has reserved the timeslot. In some implementations, shared schedule field 410 may automatically store an identifier for a default content file when the timeslot is available. For example, shared scheduling server 250 may store a list of identifiers of default content files to automatically store in shared schedule field 410 for an available timeslot.

Continuing with the above example, assume that addressable scheduling server 240 reserves the available timeslot of 10:03:00-10:03:30 on channel 500. Addressable scheduling server 240 may modify shared schedule field 410 and store "Addressable" in the owner field and "N/A" in the content filed. Further, shared scheduling server 250 may modify shared schedule field 410 to move the broadcast of content file "C" to another available timeslot (e.g., since content file "C" was previously scheduled for the 10:03:00-10:03:30 timeslot on channel 500).

Default schedule field 420 (FIG. 4A) may store information identifying timeslots and channels in which to broadcast default content files. In some implementations, default schedule field 420 may correspond to a default schedule generated by default scheduling server 230 based on information stored by shared schedule field 410.

Addressable schedule field 430 (FIG. 4A) may store information identifying timeslots and channels in which to broadcast addressable content files. In some implementations, addressable schedule field 430 may correspond to an addressable schedule generated by addressable scheduling server 240 based on information stored by shared schedule field 410.

Demographic information field 440 (FIG. 4B) may store information to identify demographic groups associated with particular user devices 210. In some implementations, demographic information field 440 may store a user device identifier (e.g., an identifier associated with a set-top box, or some other user device 210) and may store a corresponding demographic group identifier for a particular user device 210. As an example, assume that a user device 210 having the user device identifier (ID) "123" is associated with the demographic groups having the demographic IDs of "1." Given this assumption, demographic information field 440 may store the demographic IDs of "1" corresponding to the user device ID of "123." Information stored by demographic information field 440 may be used by headend system 260 to identify a particular content file to deliver to user device 210 (e.g., at a timeslot reserved by addressable scheduling server 240) based on demographics information associated with user device 210.

Addressable instructions field 450 (FIG. 4B) may store information to identify delivery instructions for content files at a time corresponding to an addressable timeslot (e.g., at a timeslot reserved by addressable scheduling server 240). Addressable instructions field 450 may store an instruction to direct headend system 260 to provide user device 210, associated with the demographic group ID of 1, with the particular content files having the identifiers "I," "J," and "K" at a time corresponding to an addressable timeslot.

As an example, assume that an addressable timeslot is scheduled for 10:03:30-10:04:00 on channel 500. Further assume that a user device 210 having the user device ID of 123 is accessing channel 500 at 10:03:30. Given these assumptions, headend system 260 may identify that user device 210 is associated with the demographic group having the demographic group ID of 1. Further, headend system 260 may identify an instruction to deliver, to user device 210, the particular content file having the identifier of "I." Continuing with the above example, assume that an addressable timeslot is scheduled for 10:04:00-10:04:30 on channel 500 and that user device 210 is accessing channel 500 at 10:04:00. Headend system 260 may identify an instruction to deliver, to user device 210, the particular content file having the identifier of "J," since the particular content file having the identifier of "J" is next in the order of delivery.

While a particular example of instructions is described above with respect to addressable instructions field 450, in practice, addressable instructions field 450 may store any instruction, rule, or algorithm in any format.

While particular fields are shown in a particular format in data structure 400, in practice, data structure 400 may include additional fields, fewer fields, different fields, or differently arranged fields than are shown in FIGS. 4A-4B.

FIG. 5 illustrates a call flow diagram of example operations capable of being performed by an example portion 500 of environment 200. As shown in FIG. 5, portion 500 may include user device 210, timeslot server 220, default scheduling server 230, addressable scheduling server 240, shared scheduling server 250, and headend system 260 and may include components and/or perform functions described above in connection with, for example, one or more of FIGS. 1-3. FIG. 5 may correspond to example operations for generating a default schedule and generating an addressable schedule based on a shared schedule data structure stored by shared scheduling server 250. Further, FIG. 5 may correspond to example operations for providing the default schedule and addressable schedule to headend system 260 such that headend system 260 may provide content files to user device 210 in accordance with the default schedule and addressable schedule.

In some implementations, timeslot server 220 may provide timeslot information 510 to default scheduling server 230. As described above, timeslot information 510 may include a list of timeslots (e.g., available timeslots) for a corresponding channel associated with timeslot server 220. In some implementations, default scheduling server 230 may receive multiple sets of timeslot information 510 from multiple timeslot servers 220. Default scheduling server 230 may perform scheduling function 515 to reserve one or more timeslots associated with timeslot information 510. For example, a user may provide default scheduling server 230 with information regarding timeslots to reserve (e.g., via a user interface of default scheduling server 230). As shown in FIG. 5, default scheduling server 230 may generate schedule data 520 and provide schedule data 520 to shared scheduling server 250. In some implementations, schedule data 520 may identify particular content files to broadcast.

In some implementations, addressable scheduling server 240 may receive timeslot information 525 from timeslot server 220. Timeslot information 525 may include information in a similar format as timeslot information 510 (e.g., a list of timeslots for a corresponding channel associated with timeslot server 220). In some implementations, addressable scheduling server 240 may receive multiple sets of timeslot information 525 from multiple timeslot servers 220. Addressable scheduling server 240 may perform scheduling function 530 to reserve one or more timeslots associated with timeslot information 525. For example, a user may provide addressable scheduling server 240 with information regarding timeslots to reserve (e.g., via a user interface of addressable scheduling server 240). As shown in FIG. 5, addressable scheduling server 240 may generate schedule data 535 and provide schedule data 535 to shared scheduling server 250.

In some implementations, schedule data 535 may identify times to broadcast an addressable content file and may include an addressable schedule having similar information as addressable schedule field 430. Shared scheduling server 250 may provide alerts to default scheduling server 230 or addressable scheduling server 240 when schedule data 520 and schedule data 535 include conflicting information (e.g., when a particular timeslot is reserved by default scheduling server 230 and by addressable scheduling server 240). In some implementations, a user of default scheduling server 230 may resolve the conflict by selecting an owner of the conflicted timeslot (e.g., via a user interface of default scheduling server 230). Alternatively, shared scheduling server 250 may automatically resolve conflicts in favor of either default scheduling 230 or addressable server 240 and may notify default scheduling 230 and/or addressable server 240.

In some implementations, default scheduling server 230 may communicate with shared scheduling server 250 to identify available timeslots (e.g., based on information associated with timeslot information 525 which default scheduling server 230 may not have previously received). Default scheduling server 230 may provide schedule updates 540 to shared scheduling server 250 (e.g., to reserve an available timeslot). In a similar manner, addressable scheduling server 240 may communicate with shared scheduling server 250 to identify available timeslots (e.g., based on information associated with timeslot information 510 which addressable scheduling server 240 may not have previously received). Addressable scheduling server 240 may provide schedule updates 545 to shared scheduling server 250 (e.g., to reserve an available timeslot).

In some implementations, default scheduling server 230 may generate default schedule 550 based on information stored by shared scheduling server 250. In some implementations, information stored by shared scheduling server 250 may correspond to information stored by shared schedule field 410 having scheduling information provided by default scheduling server 230 and addressable scheduling server 240. Information associated with default schedule 550 may correspond to information stored by default schedule field 420. As shown in FIG. 5, default scheduling server 230 may provide default schedule 550 to headend system 260.

In some implementations, addressable scheduling server 240 may generate addressable schedule 555 based on information stored by shared scheduling server 250. Information associated with addressable schedule 555 may correspond to information stored by addressable schedule field 430. As shown in FIG. 5, addressable scheduling server 240 may provide addressable schedule 555 to headend system 260.

In some implementations, headend system 260 may perform content identification function 560 based on receiving addressable schedule 555. As described above with respect to demographic information field 440 and addressable instructions field 450, headend system 260 may identify particular content to deliver to a particular user device based on information stored by demographic information field 440 and addressable instructions field 450. As further shown in FIG. 5, headend system 260 may provide content 565 to user device 210. As described above, headend system 260 may provide content to user device 210 in accordance with default schedule 550 and addressable schedule 555. For example, headend system 260 may provide, to multiple user devices 210, a particular content file at a timeslot reserved by default scheduling server 230. Further, headend system 260 may provide, to a first user device 210, a first particular content file and may provide, to a second user device 210, a second particular content file at a timeslot reserved by addressable scheduling serve 240.

While a particular series of operations and/or data flows has been described above with regard to FIG. 5, the order of the operations and/or data flows may be modified in other implementations. For example, default scheduling server 230 may perform scheduling function 515 after providing scheduling data 520 to shared scheduling server 250. Further, addressable scheduling server 240 may perform scheduling function 530 after providing scheduling data 535 to shared scheduling server 250. In some implementations, default scheduling server 230 may provide multiple schedule updates 540 and/or addressable scheduling server 240 may provide multiple schedule updates 545. Additionally, or alternatively, timeslot server 220 may provide multiple timeslot information flows to default scheduling server 230 and/or addressable scheduling server 240, and may provide updated time slot information to permit default scheduling server 230 and/or addressable scheduling server 240 to update their respective schedules accordingly. Additionally, or alternatively, the operations and/or data flows may be modified in some other manner.

Further, non-dependent operations may be performed in parallel. For example, default scheduling server 230 may receive timeslot information 510 in parallel with addressable scheduling server 240 receiving timeslot information 525. Additionally, some operations and/or data flows may be omitted altogether. For example, timeslot server 220 may omit providing timeslot information 510 to default scheduling server 230 or may omit providing timeslot information 525 to addressable scheduling server 240.

Figure 6A:
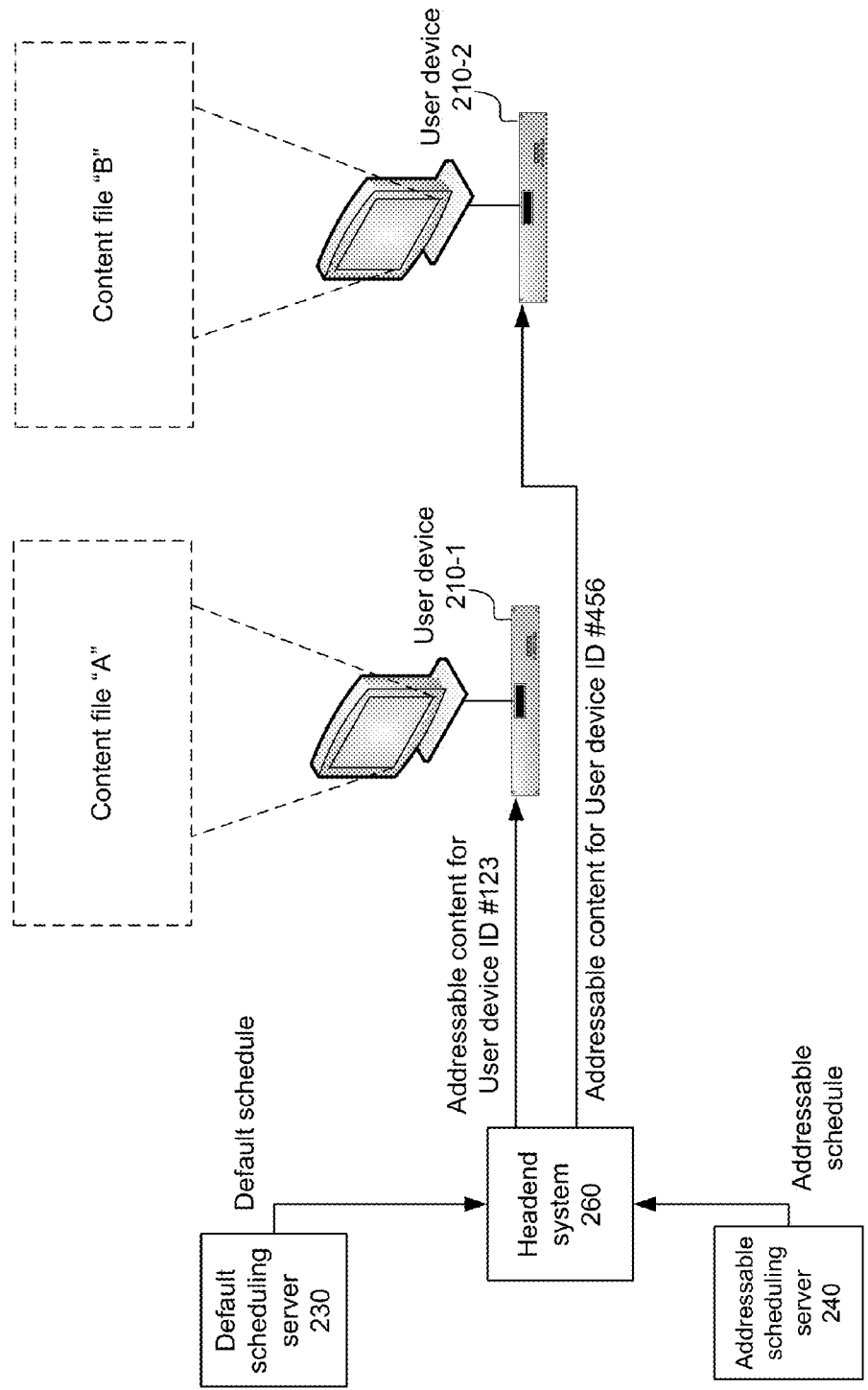
FIGS. 6A-6B illustrate an example implementation as described herein.
Figure 6B:
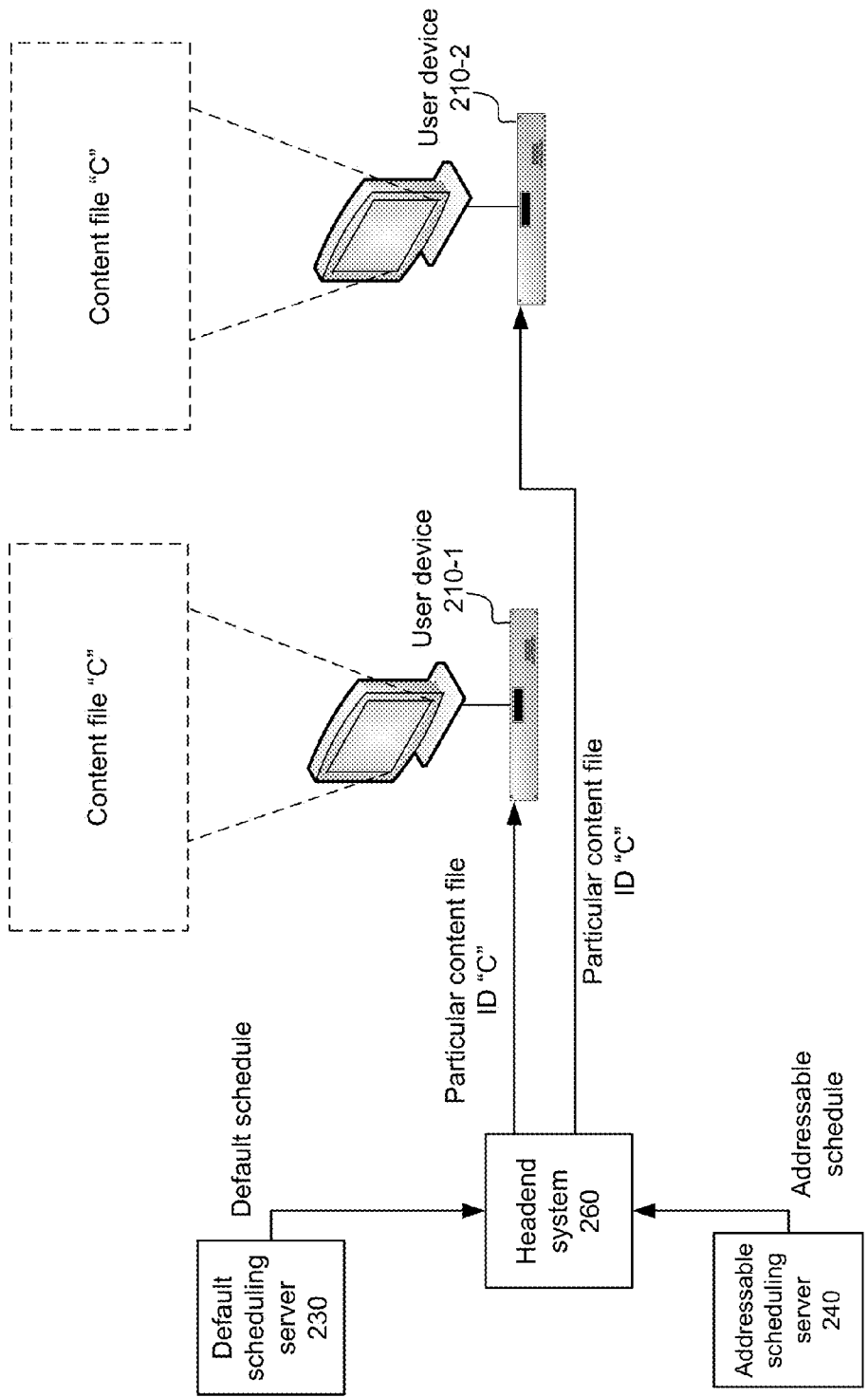

FIGS. 6A-6B illustrate an example implementation as described herein. In some implementations, FIG. 6A may correspond to providing different user devices 210 with different content files at time corresponding to an addressable timeslot. In FIG. 6A, assume that a first user device (e.g., user device 210-1 having the user device ID of "123") and a second user device (e.g., user device 210-2 having the user device ID of "456"), receive content from headend system 260 via a particular channel (e.g., television channel number 501) at a particular time (e.g., 10:02:00). Further, assume that headend system 260 stores a default schedule and an addressable schedule received by default scheduling server 230 and addressable scheduling server 240, respectively. Further, assume that the addressable schedule identifies a scheduled broadcast for an addressable file on channel number 501 at timeslot 10:02:00-10:02:30. Thus, headend system 260 may provide user device 210-1 and user device 210-2 with addressable content at 10:02:00. As described above, headend system 260 may identify a first particular content file to provide to user device 210-1 (e.g., based on demographics information of user device 210-1). Additionally, headend system 260 may identify a second particular content file to provide to user device 210-2 (e.g., based on demographics information of user device 210-2). As shown in FIG. 6A, headend system 260 may provide an addressable content file to user device 210-1 (e.g., content file "A") and may provide another addressable content file to user device 210-2 (e.g., content file "B").

Continuing with the above example, further assume that the default schedule identifies a scheduled broadcast for a particular content file (e.g., content file "C") on channel number 501 at timeslot 10:02:30-10:03:00. Thus, headend system 260 may provide user device 210-1 and user device 210-2 with the particular content file at 10:02:30. In FIG. 6B, assume that user device 210-1 and user device 210-2 each receive content from headend system 260 via channel number 501 at 10:02:30. As described above, headend system 260 may provide user device 210-1 and user device 210-2 with particular content file "C" in accordance with the default schedule. As a result, user device 210-1 and user device 210-2 may each receive different content files (e.g., a content file targeted to user device 210-1 and a content file targeted to user device 210-2) at a time corresponding to a timeslot identified by the addressable schedule, and user device 210-1 and user device 210-2 may each receive the same particular content file at a time corresponding to a timeslot identified by the default schedule.

As described above, multiple scheduling systems (e.g., default scheduling server 230 and addressable scheduling server 240) may share a common data structure for generating schedules. As a result, default scheduling server 230 and addressable scheduling server 240 may each generate a schedule without double-booking a particular timeslot. Further, default scheduling server 230 and addressable scheduling server 240 may each receive timeslot information (e.g., a list of timeslots or updates to the list of timeslots) from different timeslot servers 220 and share timeslot information via the shared data structure by communicating with shared scheduling server 250. Thus, timeslot information may be synchronized between default scheduling server 230 and addressable scheduling server 240 when default scheduling server 230 or addressable scheduling server 240 receive and/or update timeslot information in the shared data structure.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
  receiving, by one or more servers and from a first server, a first list of timeslots;
  receiving, by the one or more servers and from a second server, a second list of timeslots;
  storing, by the one or more servers, the first list of timeslots and the second list of timeslots to form a shared list of timeslots,
    the shared list of timeslots being accessible by the first server and the second server;
  receiving, by the one or more servers, an update to the shared list of timeslots by the first server or by the second server;
  storing, by the one or more servers, the update to the shared list of timeslots as an updated list of timeslots;
  receiving, by the one or more servers, a first schedule from the first server,
    the first server generating the first schedule based on information stored by the updated list of timeslots;
  receiving, by the one or more servers, a second schedule from the second server;
    the second server generating the second schedule based on information stored by the updated list of timeslots; and
  providing, by the one or more servers, a first content file to a first user device in accordance with information associated with the first schedule or the second schedule.

2. The method of claim 1, further comprising:
  providing a second content file to a second user device in accordance with information associated with the first schedule or the second schedule.

3. The method of claim 2, where the first content file is different than the second content file during a particular timeslot of the first schedule or the second schedule.

4. The method of claim 2, where the first content file is the same as the second content file during a particular timeslot of the first schedule or the second schedule.

5. The method of claim 1, further comprising:
  identifying a conflict between ownership information associated with the shared list of timeslots; and
  sending a notification of the conflict to the first server or the second server,
    the first server or second server updating the shared list based on receiving the notification of the conflict,
  where receiving the update to the shared list of timeslots includes receiving the update when the first server or second server updates the shared list of timeslots based on receiving the notification of the conflict.

6. The method of claim 1, further comprising:
  identifying the first content file based on demographics information associated with the first user device,
  where providing the first content file to the first user device is based on identifying the first content file.

7. The method of claim 1, further comprising:
  identifying the first content file based on information stored by the first schedule or second schedule that identifies the first content file,
  where providing the first content file to the first user device is based on identifying the first content file.

8. The method of claim 1, where receiving the update to the shared list of timeslots is based on the first server or the second server receiving an update to the first list of timeslots or an update to the second list of timeslots.

9. A system comprising:
  one or more servers to:
    receive, from a first server, a first list of timeslots;
    receive, from a second server, a second list of timeslots, the first server being different than the second server;
    store the first list of timeslots and the second list of timeslots to form a shared list of timeslots,
      the shared list of timeslots being accessible by the first server and the second server;
    receive an update to the shared list of timeslots by the first server or by the second server;
    store the update to the shared list of timeslots as an updated list of timeslots;
    receive a first schedule from the first server,
      the first server generating the first schedule based on information stored by the shared list of timeslots;
    receive a second schedule from the second server;
      the second server generating the second schedule based on information stored by the shared list of timeslots;
    provide a first content file to a first user device in accordance with information associated with the first schedule or the second schedule; and provide a second content file to a second user device in accordance with information associated with the first schedule or the second schedule.

10. The system of claim 9, where the first content file is the same as the second content file during a particular timeslot of the first schedule or the second schedule.

11. The system of claim 9, where the first content file is different than the second content file during a particular timeslot of the first schedule or the second schedule.

12. The system of claim 9, where the one or more servers are further to:
   identify a conflict between ownership information associated with the shared list of timeslots; and
   send a notification of the conflict to the first server or the second server,
      the first server or the second server updating the shared list of timeslots based on receiving the notification of the conflict,
   where when receiving the update to the shared list of timeslots, the one or more servers are further to receive the update to the shared list of timeslots after the first server or the second server updates the shared list of timeslots based on receiving the notification of the conflict.

13. The system of claim 9, where the one or more servers are further to:
   identify the first content file based on demographics information associated with the first user device,
   where when providing the first content file to the first user device, the one or more servers are further to provide the first content file to the first user device based on identifying the first content file.

14. The system of claim 9, where the one or more servers are further to:
   identify the first content file based on information stored by the first schedule or the second schedule that identifies the first content file,
   where when providing the first content file to the first user device, the one or more servers are further to provide the first content file to the first user device based on identifying the first content file.

15. The system of claim 9, where when receiving the update to the shared list of timeslots, the one or more servers are further to: receive the update to the shared list of timeslots based on the first server or the second server receiving an update to the first list of timeslots or an update to the second list of timeslots.

16. A non-transitory computer-readable medium for storing instructions, the instructions comprising:
   a plurality of instructions which, when executed by one or more processors associated with one or more servers, cause the one or more processors to: receive, from a first server, a first list of timeslots;
      receive, from a second server, a second list of timeslots, the first list of timeslots being different than the second list of timeslots;
      store the first list of timeslots and the second list of timeslots to form a shared list of timeslots, the shared list of timeslots being accessible by the first server and the second server;
      receive an update to the shared list of timeslots by the first server or by the second server;
   store the update to the shared list of timeslots as an updated list of timeslots;
      receive a first schedule from the first server, the first server generating the first schedule based on information stored by the shared list of timeslots, the first schedule identifying a first timeslot;
      receive a second schedule from the second server the second server generating the second schedule based on information stored by the shared list of timeslots, the second server identifying a second timeslot;
      provide a first content file to a first user device and to a second user device during the first timeslot;
      provide a second content file to the first user device during the second timeslot; and
   provide a third content file to the second user device during the second timeslot.

17. The non-transitory computer-readable medium of claim 16, where the plurality of instructions further cause the one or more processors to:
   identify a conflict between ownership information associated with the shared list of timeslots; and
   send a notification of the conflict to the first server or the second server, the first server or the second server updating the shared list of timeslots based on receiving the notification of the conflict, where one or more instructions, of the plurality of instructions, to receive the update to the shared list of timeslots, further cause the one or more processors to receive the update to the shared list of timeslots after the first server or the second server updates the shared list of timeslots based on receiving the notification of the conflict.

18. The non-transitory computer-readable medium of claim 16, where the plurality of instructions further cause the one or more processors to:
   identify the second content file based on demographics information, associated with the first user device, or based on information stored by the first schedule or second schedule that identifies the second content file, where one or more instructions, of the plurality of instructions, to provide the second content file to the first user device, further cause the one or more processors to provide the second content file to the first user device based on identifying the second content file.

19. The non-transitory computer-readable medium of claim 16, where one or more instructions, of the plurality of instructions to receive the update to the shared list of timeslots, further cause the one or more processors to receive the update to the shared list of timeslots based on the first server or the second server receiving an update to the first list of timeslots or an update to the second list of timeslots.

20. The non-transitory computer-readable medium of claim 16, where the updated list of timeslots includes information corresponding to an advertisement timeslot.

* * * * *